United States Patent [19]
Arnold et al.

[11] 3,981,365
[45] Sept. 21, 1976

[54] ROCK GATHERING MACHINE

[75] Inventors: Carl R. Arnold; Charles D. Arnold, both of Marion, Iowa

[73] Assignee: The Raymond Lee Organization, Inc., New York, N.Y. ; a part interest

[22] Filed: Mar. 10, 1975

[21] Appl. No.: 556,689

[52] U.S. Cl. .................................. 171/63; 172/32; 214/356; 209/98
[51] Int. Cl.² ......................................... A01B 43/00
[58] Field of Search ........... 214/350, 353, 357, 509, 214/78, 82, 356; 171/63, 102, 84, 19; 172/32, 801, 781; 56/13.3, 328 R; 209/98

[56] References Cited
UNITED STATES PATENTS

| | | | |
|---|---|---|---|
| 2,479,719 | 8/1949 | Boylan | 171/19 X |
| 2,560,140 | 7/1951 | Thayer | 171/63 |
| 2,947,129 | 8/1960 | Kowalik | 56/13.3 |
| 2,957,293 | 10/1960 | Roscoe et al. | 56/13.3 |
| 3,205,949 | 9/1965 | Rasmussen | 171/63 |
| 3,540,534 | 11/1970 | Rhoads | 171/63 |

*Primary Examiner*—Robert J. Spar
*Assistant Examiner*—James M. Slattery
*Attorney, Agent, or Firm*—Daniel Jay Tick

[57] ABSTRACT

A rock gathering machine for picking rocks up off the ground comprises a vehicle movable over land. A conveyor mounted on the vehicle transports rocks from the front of the vehicle to an elevated point at the rear of the vehicle. A rock catcher mounted at the front of the vehicle picks up rocks lying in the path of the vehicle and deposits them on the conveyor. A removing device mounted at the rear of the vehicle removes rocks from the conveyor and deposits them in a desired area relative to the vehicle.

2 Claims, 4 Drawing Figures

U.S. Patent  Sept. 21, 1976  3,981,365
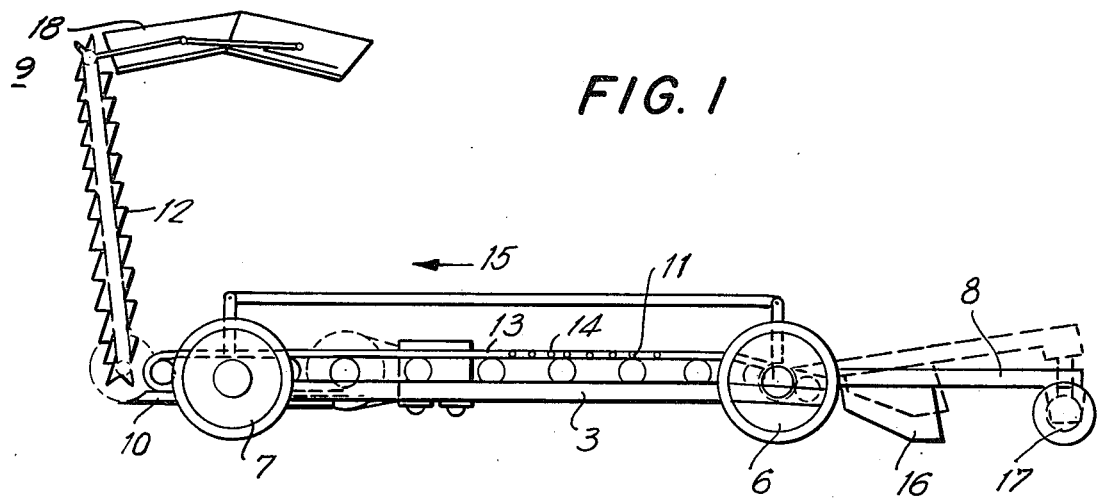
FIG. 1
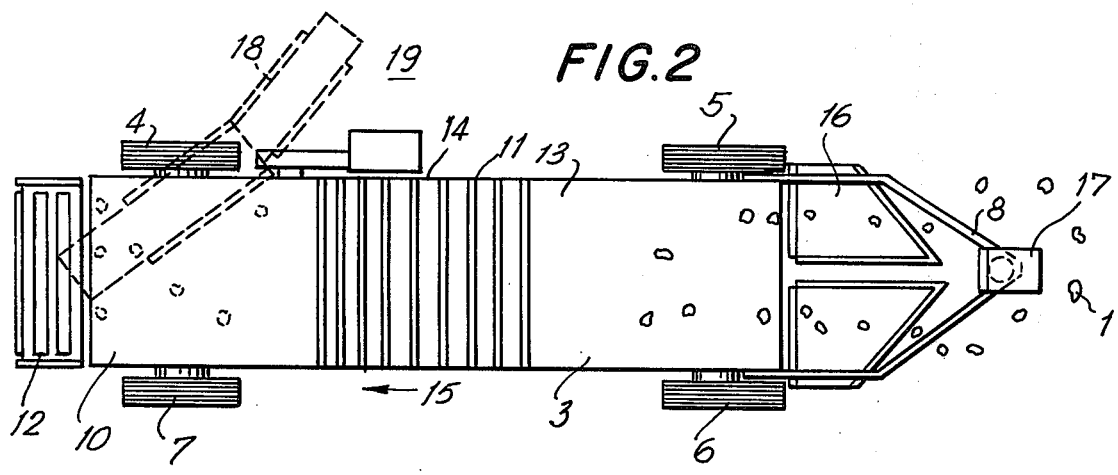
FIG. 2
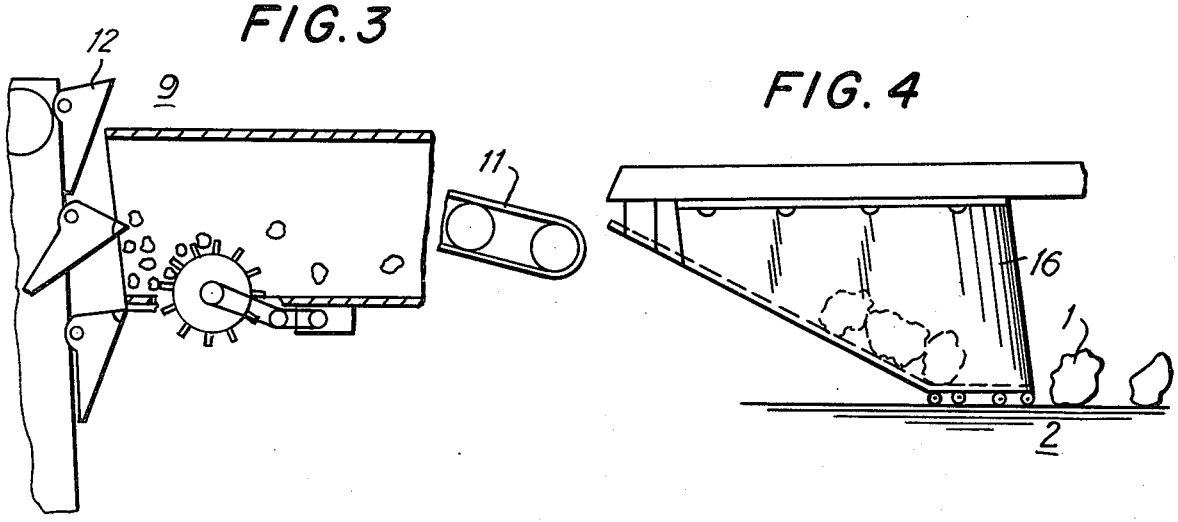
FIG. 3
FIG. 4

ROCK GATHERING MACHINE

DESCRIPTION OF THE INVENTION

The present invention relates to a rock gathering machine.

The principal object of the invention is to provide a rock gathering machine of simple structure for picking rocks up off the ground and depositing them in a desired area relative to the vehicle with efficiency, effectiveness and reliability thereby clearing land for planting with rapidity, facility and convenience.

In order that the invention may be readily carried into effect, it will now be described with reference to the accompanying drawings, wherein:

FIG. 1 is a side view of an embodiment of the rock gathering machine of the invention;

FIG. 2 is a top view of the embodiment of FIG. 1;

FIG. 3 is a view, partly in section, on an enlarged scale, of the upper part of the vertical section of the rock gathering machine of the invention; and FIG. 4 is a view, on an enlarged scale, of an embodiment of the rock catcher of the rock gathering machine of the invention.

In the Figures, the same components are identified by the same reference numerals.

The rock gathering machine of the invention picks up rocks 1, and so on (FIG. 4) up off the ground 2 (FIG. 4). The rock gathering machine comprises a vehicle 3 (FIGS. 1 and 2) movable over land via any suitable means such as, for example, wheels 4, 5, 6 and 7 (FIG. 2).

A conveyor arrangement is mounted on the vehicle 3 for transporting rocks from the front 8 (FIGS. 1 and 2) of the vehicle 3 to an elevated point 9 (FIGS. 1 and 3) at the rear 10 of the vehicle (FIGS. 2 and 3). The conveyor arrangement comprises a substantially horizontal section 11 of the conveyor and a substantially vertical section 12 of the conveyor (FIGS. 1 and 2).

The horizontal section 11 of the conveyor comprises endless belt means 13 (FIGS. 1 and 2) having a plurality of spaced rod-like members 14, and so on (FIGS. 1 and 2), transverse to the direction of movement of the belt means, as indicated by an arrow 15 (FIGS. 1 and 2). Small stones and dirt fall back onto the land under the vehicle 3 through the spaces between the members 14, and so on.

A rock catcher 16 (FIGS. 1, 2 and 3) mounted at the front 8 of the vehicle 3 picks up rocks lying in the path of the vehicle and deposits them on the horizontal section 11 of the conveyor arrangement. The rock catcher 16 comprises plow lay means including an adjusting wheel 17 (FIGS. 1 and 2) for adjusting the distance of the plow lay means above the ground.

A removing device 18 (FIGS. 1, 2 and 3) mounted at the rear 10 of the vehicle 3 removes rocks from the conveyor arrangement and deposits them in a desired area 19 (FIG. 2) relative to the vehicle. The removing device 18 comprises a sleeve which directs rocks from the vertical section 12 of the conveyor arrangement to the area 19 alongside the vehicle 3.

While the invention has been described by means of a specific example and in a specific embodiment, we do not wish to be limited thereto, for obvious modifications will occur to those skilled in the art without departing from the spirit and scope of the invention.

I claim:

1. A rock gathering machine for picking rocks up off the ground, said rock gathering machine comprising
a vehicle movable over land;
conveyor means mounted on the vehicle for transporting rocks from the front of the vehicle to an elevated point at the rear of the vehicle, said conveyor means comprising endless belt means having a plurality of spaced rod-like members transverse to the direction of movement of the belt means whereby small stones and dirt fall onto the land under the vehicle, a substantially horizontal section of the conveyor, and a substantially vertical section of the conveyor;
rock catching means mounted at the front of the vehicle for picking up rocks lying in the path of the vehicle and depositing them on the conveyor means; and
removing means mounted at the rear of the vehicle for removing rocks from the conveyor means and depositing them in a desired area relative to the vehicle, said removing means comprising sleeve means directing rocks from the vertical section to an area alongside the vehicle.

2. A rock gathering machine as claimed in claim 1, wherein the rock catching means comprises plow lay means including adjusting means for adjusting the distance of the plow lay means above the ground.

* * * * *